United States Patent [19]

Aguilar

[11] Patent Number: 5,753,278
[45] Date of Patent: May 19, 1998

[54] LABEL SKEW ADJUSTER FOR AN IN-MOLD LABELING BLOW MOLDING MACHINE

[75] Inventor: Albert Aguilar, Carol Stream, Ill.

[73] Assignee: Liquid Container L.P., West Chicago, Ill.

[21] Appl. No.: 745,937

[22] Filed: Nov. 8, 1996

[51] Int. Cl.$^6$ .................. B29C 49/22; B65H 1/06; B65H 3/50
[52] U.S. Cl. ............. 425/503; 264/509; 271/9.12; 271/11; 271/12; 271/98; 425/126.1; 425/522
[58] Field of Search ............. 271/9.12, 12, 11, 271/98, 241; 425/503, 126.1, 522; 264/509

[56] References Cited

U.S. PATENT DOCUMENTS

| | | | |
|---|---|---|---|
| 2,603,483 | 7/1952 | Fischer et al. | 271/9.12 |
| 4,397,625 | 8/1983 | Hellmer et al. | 425/522 |
| 4,637,600 | 1/1987 | Bartimes et al. | 425/522 |
| 4,834,641 | 5/1989 | Keyser | 425/503 |
| 4,944,665 | 7/1990 | Hasl et al. | 425/126.1 |
| 5,026,266 | 6/1991 | Takasaki et al. | 425/503 |
| 5,031,892 | 7/1991 | Stieger | 271/11 |
| 5,044,922 | 9/1991 | Plenzler et al. | 425/503 |
| 5,161,791 | 11/1992 | Akiyama et al. | 271/12 |
| 5,266,149 | 11/1993 | Collette et al. | 264/509 |

FOREIGN PATENT DOCUMENTS 4218203  12/1993  Germany ................. 271/98

*Primary Examiner*—Robert Davis
*Attorney, Agent, or Firm*—Hill & Simpson

[57] ABSTRACT

A label pickup mechanism for an in-mold blow molding machine has a rotating magazine system which allows the captive stack of labels to rotate about a center point by sliding on a circular track of a radius common to the base plate of the label magazine and a front plate carried in the label support apparatus. Such rotation prevents the label stack to lose its coordinate position while trying to address label askewness. The label stack is kept compressed against retaining tabs by using label pushers.

9 Claims, 4 Drawing Sheets

LABEL SKEW ADJUSTER FOR AN IN-MOLD LABELING BLOW MOLDING MACHINE

FIELD OF THE INVENTION

This invention relates generally to blow molding machines and more particularly to a method and apparatus for in-mold labeling of blow molded articles, wherein the machine is improved with a label skew adjuster for simply adjustable positioning the label magazine in such a manner in a proper position of alignment for an appropriate affixation of the label to the wall of the blow bottle or article being formed in the blow molding machine.

1. The Prior Art

In most of the prior art devices presently available, mechanisms have been employed which are required to have arms or linkages which insert the label into the mold at a single point of intersection of the path of such mold. Such devices utilize complex coordination mechanisms thus requiring a slow operation with limited productivity.

In patents owned by the assignee of the present invention, for example, as in U.S. Pat. No. 4,834,641 issued May 30, 1989, there is disclosed the utilization of a trolley or carriage which is continuously driven through a guide track means forming a closed circuit and cooperates with a rotating circular wheel of a blow molding machine having a plurality of mold pairs around its periphery. The molds and the trolleys or carriages move through overlapping segments of two paths which extend through a discrete distance in unison at zero relative velocity, thereby permitting the label to be transferred from the carriage to the mold without interruption of either.

SUMMARY OF THE PRESENT INVENTION

A cage-like construction made of metal such as aluminum is supported between steel plates and forms a hollow enclosure, or magazine, that keeps the label stack captive. That cage is used in conjunction with label pushers to feed labels onto brass tabs. The label pushers may take several forms, for example, gravity feed, magnetic couple pneumatic or simply pneumatic. A flat plate is provided with cut-out circular disk tracks to hold rotating disks on which the magazine construction is supported.

With the arrangement of the present invention, new label change over time is reduced. The rotating magazine system allows the magazine together with its captive stack of labels to rotate about a center point by sliding relative rotatable displacement on a circular track of a radius common to the disk supporting the label support apparatus.

That relative rotation prevents the label stack to lose its coordinate position while trying to address label askewness. The label stack is kept compressed against retaining tabs by using the label pushers. This allows the labels to be compressed at a constant rate without the use of coiled springs or weights on carts, as in the prior art, thereby eliminating the problem of spring fatigue and also eliminating the risk of binding which occurs when weights on push plates using little rollers that ride on guide tracks that are simultaneously used as label guides.

DESCRIPTION OF THE PREFERRED EMBODIMENTS

In the field of blow molding technology, the advantages of continuous flow between the wheel of a machine having multiple pairs of blow molds and label applying adjuncts may be achieved in several ways, for example, by means of electronic controls as well as by mechanical arrangements as disclosed in the acknowledged prior art. It should be understood that the principles of the present invention are applicable to any machine where label pickup is applicable and where the problems of label handling are to be overcome.

Figure 1:
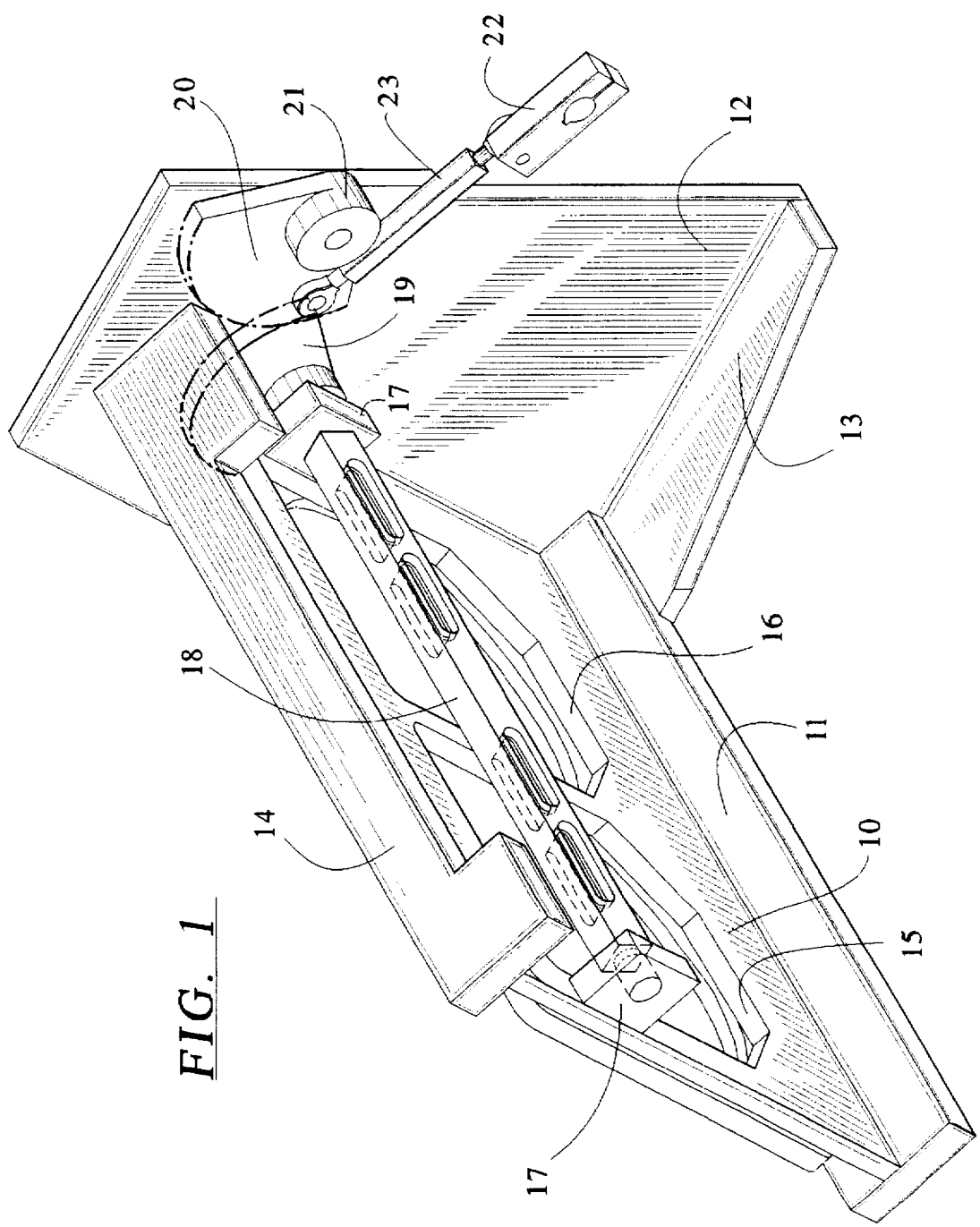
FIG. 1 is a perspective view of a sub-assembly incorporated in an in-mold labeler label pickup assembly provided in accordance with the principles of the present invention.

Referring to the drawings, and particularly to FIG. 1, there is shown a label pickup assembly, or possibly, with more precise meaning, a sub-assembly, since the structure of FIG. 1 is a mounting assembly in which the front plate of a rotating magazine is captured between two plates in firm assembly therewith, while allowing the magazine assembly to rotate in accomplishing the objectives of this invention.

A front magazine mounting plate is shown at 10 and is carried on a bottom support brace 11. At the end of the mounting plate 10 is a side plate 12. To facilitate assembly, a gusset member 13 is disposed between the brace 11 and the side plate 12. A top brace 14 is connected to the top of the mounting plate 10, and at its end to the side plate 12.

In order to accommodate both right and left label magazines, the mounting plate 10 has openings formed therein at 15 and 16, respectively.

A pair of bearing blocks 17,17 are connected to opposite ends of the mounting plate 10 and journal a swing arm shaft 18. The end of the swing arm shaft 18 is connected to a swing arm gear 19 toothed to have meshing interrelationship with a drive gear 20 journalled for rotary movement and supported by the side plate 12 via bearing means 21. A crank 22 is connected to the drive gear 20 by means of an adjustable turnbuckle 23.

In order to capture the rotating magazine of the invention, a magazine base plate 26 is provided. A rotating disk plate 28 (FIGS. 2 and 4) can be captured between the plates 10 and 26 as will now be explained. It will be understood that the plate members may be made of a suitable metallic material such as steel plating stock which is cut and shaped to the desired configuration.

Figure 2:
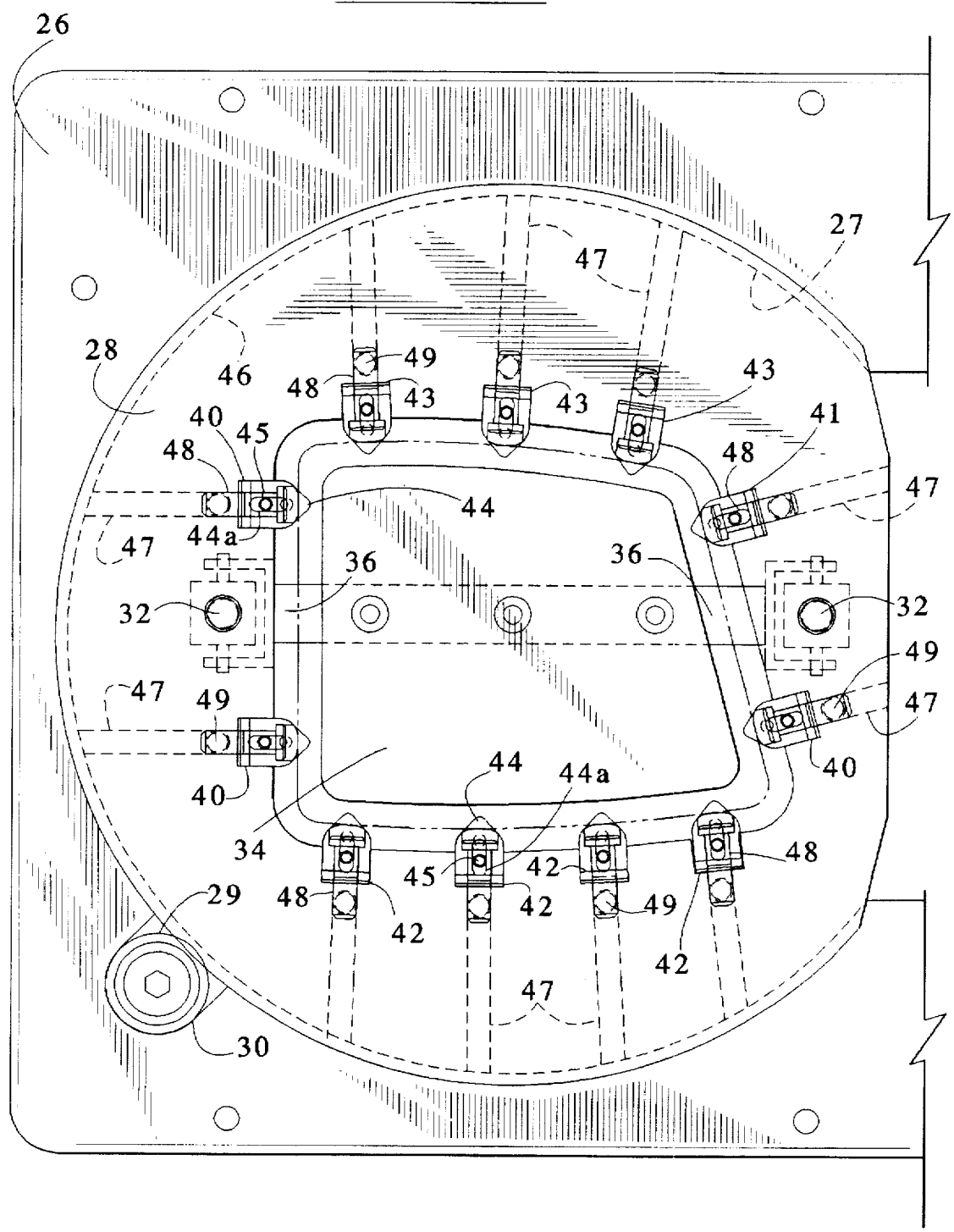
FIG. 2 is a plan view of the rotating magazine utilized in the label pickup assembly of FIG. 1.
Figure 3:
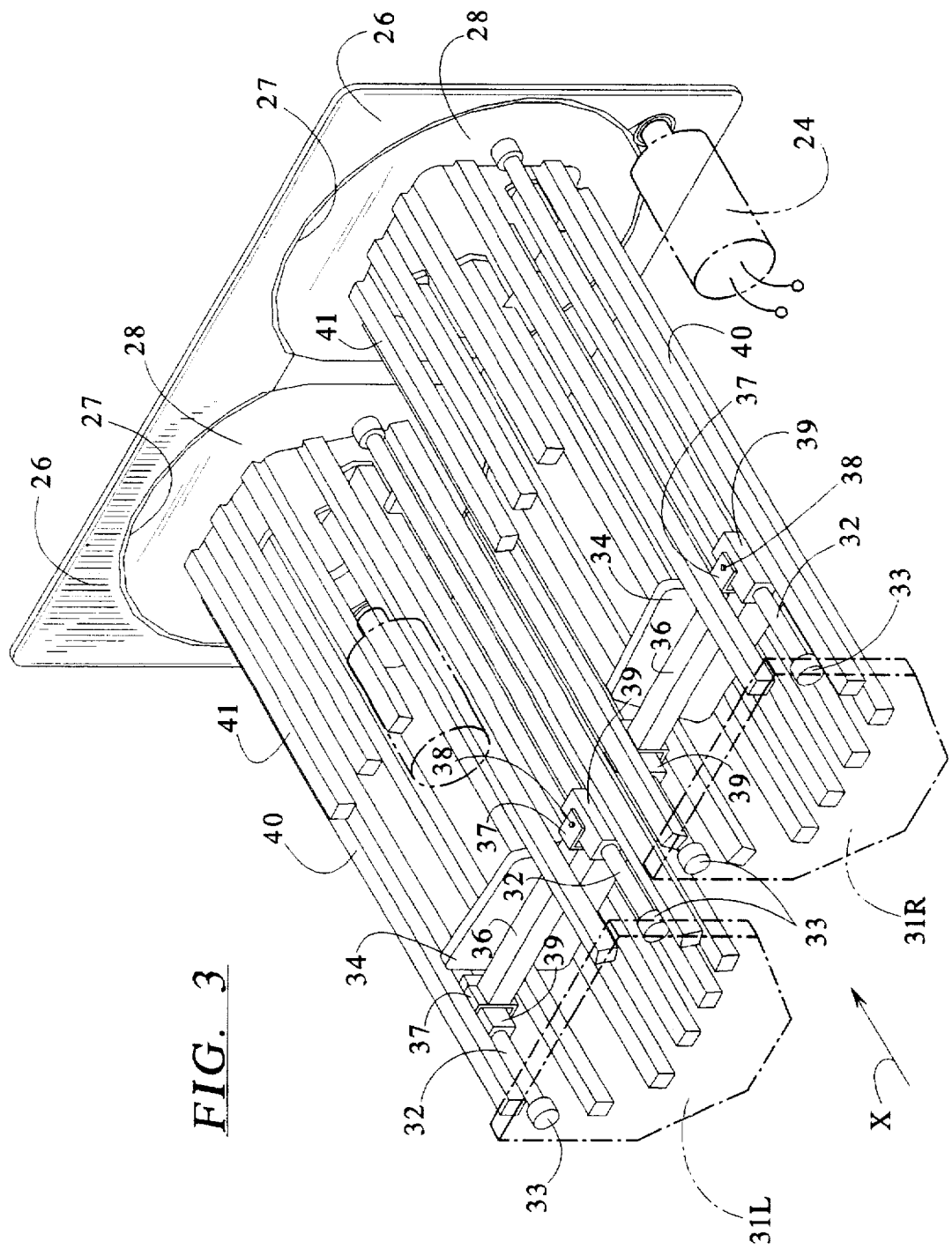
FIG. 3 is a fragmentary perspective view of the label pickup assembly, but with parts removed and with parts shown in cross-section to illustrate details of the present invention.
Figure 4:
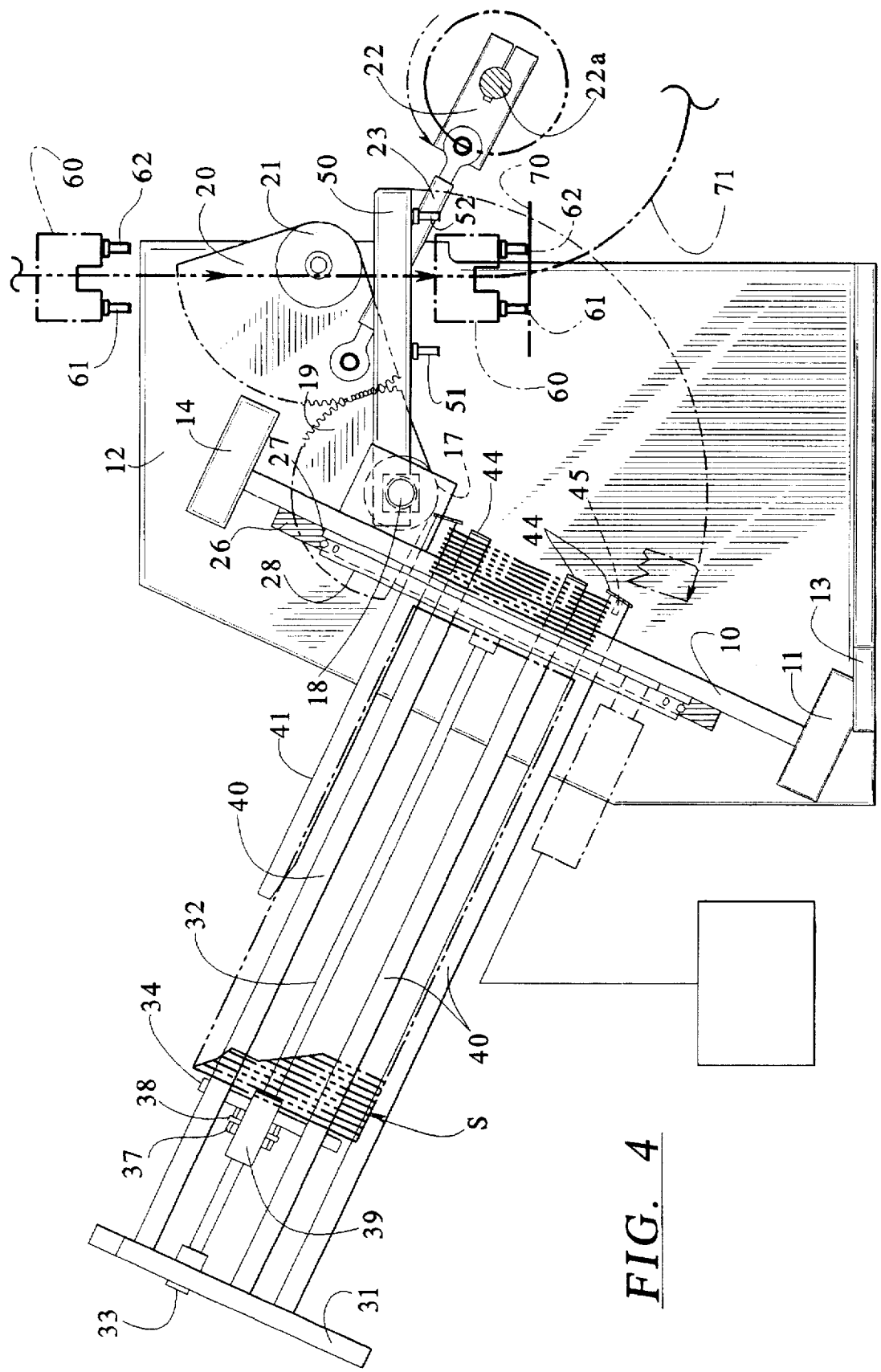
FIG. 4 is a side elevational view of the pickup area of a blow molding machine with parts shown schematically and illustrating the mode of cooperation between the trolley or carriage with the label pickup assembly, as contemplated by the present invention.

Referring now in greater detail to the views of FIGS. 2, 3 and 4 of the drawings, the rotating disk plate 28 is one element of a generally cage-like construction that is effectively kept captive by the plates 10 and 26.

The base plate 26 has an opening 27 for both left hand and right hand, thereby corresponding to the openings 15 and 16 in the mounting plate 10. However, only the right hand portion of the base plate 26 is shown in FIG. 2 and it will be understood that corresponding elements of structure are utilized so that the label pickup mechanism can accommodate the placement of labels on both sides of a blow molded bottle, or other blow molded article.

It is important to note that the opening 27 has a somewhat grooved profile in cross-section (see FIG. 4), thereby allowing the opening 27 to form a generally circular track. Disposed in the opening 27 for relative angular adjustment, i.e., for relative limited rotation within the confines of the track formed by the opening 27, is a rotating disk plate 28. A spur gear 29 captured in a circular recess 30 effects relative movement between the two elements. Spur gear 29 can be rotated manually, or it is contemplated that it could be selectively driven by a servo device 24 controlled electronically as part of an overall control system.

For illustrative purposes, left and right hand back plates are shown at 31R and 31L (FIG. 3). An air cylinder unit commercially available under the trademark TELOMATIC includes a pair of guide rods 32 for each of the right and left hand sides of the pickup assembly and each rod 32 extends between the back plate 31 and the front plate 28, there being a special hex nut 33 for connecting the rods 32 of the unit at the back plate 31. A right hand push plate 34 (or a left hand push plate, as the case may be) is engaged by a push plate bracket 36 having a clevis 37 at each respective end which is pinned as at 38 to a slide 39 carried on each of the rods 32 and operated by the air cylinder and acting to push a supply of labels towards the front plate 28, as depicted in FIG. 3.

The cage-like construction of the pickup assembly further includes a plurality of long guide bars 40, a total of six in the illustrative exemplification of the herein described embodiment, and a pair of short guide bars 41. Additionally, there are provided guide bars with flutter, six in this embodiment, identified at 42 as well as six short guide bars with flutter as identified at 43. The designation "with flutter" as used in this disclosure means:

A flutter bar is a bar that has internal air passage means and can be supplied with air under pressure. In operation, the flow of air helps separate the labels from one another in the stack.

Each of the guide bars 40, 41, 42 and 43 has affixed to the end thereof a label finger 44, preferably made of a material such as metal or plastic. Together with one another and with the front and rear plates there is formed an enclosure, or a magazine, in which is confined a stack of labels. The cage-like label magazine is generally made up of elements made of aluminum, except for the plate members at opposite ends which may be made of a metal such as steel. A label stack shown generally at "S"(FIG. 4) is confined within the cage-like magazine.

In one exemplary form of the invention and described herein for purpose of illustration, the rotating disk plate 28 of the magazine has a circular periphery 46 which is characterized by a plurality of radial passages 47 spaced apart circumferentially relative to one another and each is sized and shaped to receive a clevis pin 48. The clevis pins 48 can be locked in adjusted position my means of a set screw 49, thereby permitting each of the rod members to be relatively adjusted to accommodate the shape of the individual labels confined within the label stack S.

Further, in the illustrated embodiment of the invention, label pushers, such as the magnetic coupled pneumatic cylinders are employed to keep the label stack S against the retention of the tabs, or fingers 44, so that cooperation allows the labels to be compressed at a constant rate, an advantage over systems utilizing coiled springs or weights carried on carts. Each tab or finger 44 has a slot 44a through which a set screw 45 may be directed into threaded recess in the end of a corresponding rod member (see FIGS. 2 and 4) thereby permitting the individual tabs or fingers 44 to be precisely adjusted in a radial direction to optimize the removal of an individual label from the label stack S by the action of the swing arm.

Referring specifically to FIG. 4, it will be noted that the crank 22 is rotated in the direction of the arrow, to wit, in a counter-clockwise direction, using the orientation of FIG. 4 about an axis established by a crank shaft 22a. A transfer arm 50 is provided for each label to be applied. The transfer arm 50 is connected to the swing arm shaft 18 with the aid of elongated mounting slots shown in FIG. 1, thereby permitting the transfer arm 50 to be adjustably aligned in proper register with the end label retained at the end of the label stack S by the fingers 44.

Accordingly, as the crank 22 is rotated, the transfer arm 50 will be actuated so that it oscillated around the axis of the transfer arm shaft 18. In order to grasp and retain a label from the stack S, the swing arm is provided with suction means including one or more suction cups carried on suction cup holders 51 and 52 spaced apart from one another a sufficient distance so that a carriage or trolley 60 having its own suction means including one or more suction cups 61 and 62 spaced apart from one another a lesser, or different distance than the spacing dimension of the suction cups 51 and 52 can intercept a label 70 removed from the stack S and placed in the path of the carriage or trolley 60 by the transfer arm 50.

A fragment of the path of travel of the carriage or trolley 60 is shown, or represented schematically, by the broken line 71 at the right hand side of FIG. 4. Those versed in the art will recognize that the carriage or trolley 60 comprises a carriage mean s including a plurality of trolleys or carriages which are continuously driven in a closed circuit without any interruption and which closed circuit is formed by a guide track means and a driving motor means of the same general construction and operation as previously disclosed in U.S. Pat. No. 4,834,641.

In the illustrative embodiment of this disclosure similar to U.S. Pat. No. 4,834,641, the mechanism is driven in such a manner that the speed of the carriages 60 is the same as the speed of the mold parts (not shown) during travel through a specific segment of the circular mold path which is a primary path and which is matched with a specific segment of the guide track means 71 which is a secondary path. However, as noted above, mechanical synchronization is not absolutely essential to the practice of the present invention. Synchronization effective to efficiently transfer a label from a carriage t o a mold part can also be achieved electronically, or by other equivalent means.

By virtue of the arrangement described above, the rotating magazine system allows the captive label stack S to rotate about a center point by sliding relative movement of the front plate in the opening 27 of the base plate 26. That concept is highly advantageous because it prevents the label stack S from losing its coordinate position while trying to address label askewness, a common problem in the art of in-mold labeling.

Further the label stack S is kept compressed against the fingers 44 at a constant rate by the use of label pushers such as magnetic coupled pneumatic cylinders, gravity feed or simply pneumatic.

Although minor modifications might be suggested by those versed in the art, it should be understood that I wish to embody within the scope of the patent warranted hereon all such modifications as reasonably and properly come within the scope of my contribution to the art.

I claim as my invention;:

1. In a label pickup mechanism for use in an in-mold labeling blow molding machine, the improvement of:

cage means supported between end plates to captivate a stack of labels, and a flat plate with an opening forming a circular disk track in which said cage means is carried for relative rotatable adjustment, whereby there is formed a rotating magazine system which allows the captive stack of labels to rotate about a center point by sliding on the circular track, thereby preventing the stack of labels from losing its coordinate position while trying to address label askewness.

2. In combination with a label pickup mechanism for an in-mold labeling blow molding machine, the improvement of, a rotating magazine system comprising a label stack cage having rotatable mounting means, thereby to prevent the label stack to lose its coordinate position while trying to address label askewment.

3. In a label pickup mechanism for an in-mold labeling blow molding machine as defined in claim 2, said label stack cage receiving and confining a label stack therein, a plurality of inwardly projecting fingers at one end of the label stack cage against which the label stack engages, and label pushers for keeping the label stack compressed at a constant rate against the fingers.

4. The invention of claim 3 wherein said label stack cage is formed of aluminum and wherein said fingers are formed of metal or plastic.

5. A blow molding machine comprising in combination, a wheel carrying a plurality of mold halves arranged in a circumferential array and into which a parison is projected and internally pressurized to form a blow molded article, in-mold labeling mechanism integrated with the blow molding machine, said mechanism having a label storage and pickup means comprising, a magazine cage for receiving a label stack, a pickup device for picking one label at a time from one end of the label stack, mounting means including circular track means between said mounting means and said magazine cage and rotatably carrying said magazine in relative alignment registry with said pickup device, said circular track means allowing the label magazine cage to rotate and thereby prevent the label stack to lose its coordinate position while trying to address label askewness.

6. A blow molding machine as defined in claim 5 and further characterized by said in-mold label mechanism having a label magazine formed as an enclosure in which a label stack is stored and having a plurality of fingers projecting radially inwardly at one end of the enclosure against which the label stack is bottomed, and magnetic coupled pneumatic cylinders for compressing the label stack against the fingers at a constant compression rate.

7. A blow molding machine as defined in claim 5 and further characterized by said label magazine having a front plate and a back plate each made of steel and spaced longitudinally from one another, said label magazine further including a plurality of rods made of aluminum and extending in an array between the front and back plates to form a generally hollow longitudinal enclosure, said front plate having an opening therein formed with a circular opening having radially inward edges through which labels may be directed to a label pickup transfer arm, said magazine having a base plate formed with a circular periphery and sized to be received in said circular opening of said front plate, track means between said periphery of said base plate and the edges of said opening in said front plate, whereby said magazine is supported for relative rotational adjustment in said track means with respect to said front plate, mounting means in said base plate for adjustably positioning said rods, thereby to selectively alter the magazine to accommodate different label configurations, and fingers on the ends of said rod members against which the label stack is bottomed, each of said fingers having adjustable connecting means so that the fingers may be individually adjusted in optimal radial position relative to the label stack.

said rotatable magazine allowing the captive stack of labels to rotate about a center point by sliding on the circular track of a radius common to the base plate supporting the label magazine.

8. In a mechanism as defined in claim 3, wherein said label pusher comprises:

magnetic coupled pneumatic cylinders.

9. A blow molding machine as defined in claim 7 and further characterized by servo means connected in mechanical driving relationship to said magazine and having electronic control means, thereby to control the rotational adjustment of the magazine electronically.

* * * * *